United States Patent

Dage

[19]

[11] Patent Number: 6,067,808
[45] Date of Patent: May 30, 2000

[54] METHOD OF AIR CONDITIONER OPERATION FOR MINIMIZING MOISTURE CONDENSED ON EVAPORATOR CORE

[75] Inventor: Gerhard Allan Dage, Franklin, Mich.

[73] Assignee: Ford Motor Company, Dearborn, Mich.

[21] Appl. No.: 09/160,033

[22] Filed: Sep. 24, 1998

[51] Int. Cl.$^7$ ................................. F25D 21/04
[52] U.S. Cl. ............... 62/150; 62/176.6; 62/244; 165/202; 165/249; 454/75; 454/229; 236/49.3
[58] Field of Search ............... 454/75, 256, 229; 165/202, 203, 204, 42, 43, 248, 249, 250, 251; 236/49.3; 62/186, 176.1, 176.2, 176.3, 176.4, 176.5, 176.6, 180, 150, 244

[56] References Cited

U.S. PATENT DOCUMENTS

| | | | |
|---|---|---|---|
| 3,662,818 | 5/1972 | Snyder | 165/23 |
| 3,979,922 | 9/1976 | Shavit | 165/251 X |
| 4,841,733 | 6/1989 | Dussault et al. | 165/249 X |
| 4,848,444 | 7/1989 | Heinle et al. | 165/21 |
| 4,858,676 | 8/1989 | Bolfik et al. | 165/2 |
| 4,895,000 | 1/1990 | Takahashi | 62/176.6 X |
| 4,917,293 | 4/1990 | Fedter et al. | 236/49.3 |
| 4,932,588 | 6/1990 | Fedter et al. | 236/44 R |
| 5,385,028 | 1/1995 | Gavlak | 62/81 |
| 5,427,313 | 6/1995 | Davis, Jr. et al. | 236/49.3 |
| 5,546,754 | 8/1996 | Terao et al. | 62/133 |
| 5,553,776 | 9/1996 | Davis, Jr. et al. | 236/49.3 |
| 5,907,954 | 6/1999 | Kettner | 165/251 X |

FOREIGN PATENT DOCUMENTS

| | | | |
|---|---|---|---|
| 576496 | 10/1977 | U.S.S.R. | 62/176.6 |

*Primary Examiner*—Harry B. Tanner
*Attorney, Agent, or Firm*—Roger L. May; Frank G. McKenzie

[57] ABSTRACT

A method for reducing overall workload of a vehicle air conditioning (a/c) system takes into account the humidity conditions. A high humidity condition can be detected by monitoring windshield wiper operation for a threshold period of time. High humidity exists during rain or fog and wiper operation for more than three minutes can indicate high humidity. The method includes operating the vehicle heating, ventilating and air conditioning (HVAC) system with the a/c on in a recirculation or partial recirculation mode when the wipers have been on for longer than the threshold period to remove moisture from cabin air thereby reducing the amount of moisture condensed by evaporator core and decreasing overall workload of the a/c system. The method also includes operating HVAC system with the a/c on in the recirculation or partial recirculation mode when the wipers have not been on at all of for longer than the threshold time and relative humidity is greater than a threshold humidity to remove moisture from recirculated cabin air thereby reducing the amount of moisture condensed by the evaporator core and decreasing overall workload of a/c system.

18 Claims, 5 Drawing Sheets

METHOD OF AIR CONDITIONER OPERATION FOR MINIMIZING MOISTURE CONDENSED ON EVAPORATOR CORE

TECHNICAL FIELD OF THE INVENTION

The present invention relates generally to heating, ventilating and air conditioning (HVAC) systems, and, more particularly, to a method of air conditioner (a/c) operation for reducing the overall workload of a/c system and minimizing the amount of moisture condensed on the evaporator core.

BACKGROUND OF THE INVENTION

During air conditioner (a/c) operation in a heating, ventilating and air conditioning (HVAC) system in a vehicle, moisture condenses out of the air that is being conditioned. The air is cooled by an evaporator and moisture physically condenses on the evaporator core. Because of the core design, this moisture often accumulates on the core fins. Because the evaporator core must be an efficient heat exchanger, it is designed with louvered or cupped fins. While these fins are efficient for forced air convection, they naturally do an excellent job of retaining moisture during and after normal air conditioner operation. When the vehicle is inoperative or the HVAC is turned off, air surrounds the moisture laden evaporator core within a plenum, chamber or ducting system which provides an environment for bacteria and other odor causing organisms.

During a/c operation, automatic HVAC systems will typically operate in a recirculation or partial recirculation mode under extreme operating conditions until the cabin approaches a comfortable level. At this point the system operates in outside air mode, unless manually overridden. Moisture in the air tends to condense on the evaporator core with more humid air causing more moisture to condense. That is to say, more moisture is condensed from the typically more humid outside air than from the less humid recirculated cabin air. At high levels of humidity, the a/c system compressor consumes more horsepower than at low levels of humidity. It is desirable to reduce overall a/c system energy consumption for greater fuel economy. While continuously operating in the recirculation or partial recirculation or partial recirculation or partial recirculation mode would greatly reduce compressor energy consumption, it would yield cabin air that is too dry and too cold for comfort. Accordingly, it will be appreciated that it would be highly desirable to have a system which factors in humidity conditions when choosing an operating mode and which reduces moisture condensed by the evaporator core to discourage microbial growth and odor.

SUMMARY OF THE INVENTION

The present invention is directed to overcoming one or more of the problems set forth above. Briefly summarized, according to one aspect of the present invention, a method for minimizing the amount of moisture condensing on the HVAC system evaporator core, wherein the HVAC system has a fresh air mode of operation in which fresh outside air is cooled without vehicle cabin air and has a recirculation or partial recirculation mode of operation in which cabin air is recirculated without mixing fresh outside air, comprises ascertaining outside relative humidity conditions. By determining whether the windshield wipers are on and have been on for longer than a preselected minimum threshold time, high outside relative humidity is ascertained. Operating the HVAC system in a/c recirculation or partial recirculation mode instead of a/c outside air mode, when the wipers have been on for longer than the threshold time, to remove moisture from cabin air, minimizes moisture available to condense on the evaporator core. This conserves energy while maintaining cabin comfort and reducing opportunities for microbial growth and odors. The method includes determining whether outside relative humidity is above a preselected threshold humidity. Operating the HVAC system with the a/c on in the recirculation or partial recirculation mode when the wipers have not been on for longer than the threshold time and relative humidity is greater than the threshold humidity, to remove moisture from cabin air, minimizes moisture available to condense on the evaporator core. This also conserves energy while maintaining cabin comfort and reducing opportunities for microbial growth and odors. Adding a warm air bias to maintain HVAC discharge temperature ensures dehumidified cabin air at the desired temperature.

According to another aspect of the invention, a method for reducing overall workload of the a/c system comprises the steps of determining whether the windshield wipers are on and have been on for longer than three minutes; operating the HVAC system with the a/c on in the recirculation or partial recirculation mode when the wipers have been on for longer than three minutes and removing moisture from cabin air thereby reducing amount of moisture condensed by evaporator core and decreasing overall workload of the a/c system. The method includes determining whether outside relative humidity is above 50%; and operating the HVAC system with the a/c on in the recirculation or partial recirculation mode when the wipers have not been on for longer than three minutes and relative humidity is greater than 50%, to remove moisture from recirculated cabin air thereby reducing amount of moisture condensed by the evaporator core and decreasing overall workload of the a/c system.

By factoring in relative humidity, outside air is not introduced when doing so would increase the overall workload of the a/c system. Thus, the a/c system operates in the recirculation or partial recirculation mode during high humidity conditions of rain or fog to reduce moisture on the evaporator core and to maximize fuel economy.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE PREFERRED EMBODIMENTS

Figure 1:
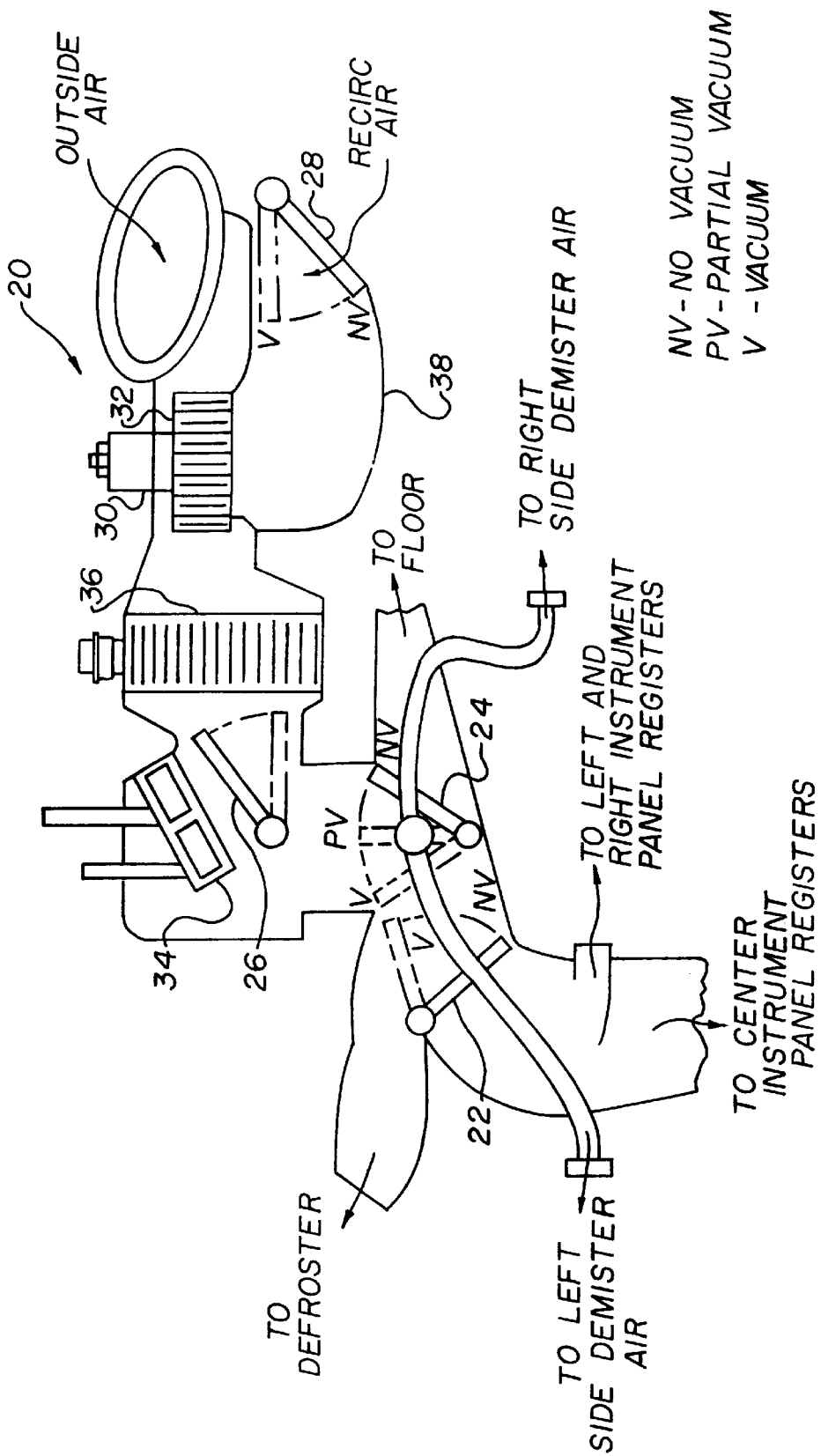
FIG. 1 is a diagram illustrating an air handling system including an air conditioner system which can be operated according to the method of the present invention.

FIG. 1 is schematic diagram illustrating an air handling system as described in U.S. Pat. No. 5,553,776 which issued Sep. 10, 1996 to Leighton I. Davis, Jr., et al. and U.S. Pat. No. 5,427,313 which issued Jun. 27 1995 to Leighton I. Davis, Jr., et al., the disclosures of which are incorporated herein by reference. The air handling system 20 of a heating, ventilation and air conditioning (HVAC) system, includes an arrangement of panel-defrost, floor-panel, temperature blend and outside recirculation or partial recirculation air actuators or doors 22, 24, 26 and 28, respectively. The doors 22 and 24 may be driven by vacuum motors (not shown) between their various vacuum, partial vacuum and no vacuum positions in a conventional fashion as indicated by broken lines. All doors may be driven by an electric servomotor so that the positions of the doors are continuously variable. The system also includes a variable speed motor 30 including a blower wheel 32. The system further includes heating and cooling elements such as a heater core 34 and an evaporator core 36 in a typical air conditioning plant. The evaporator temperature is normally controlled in a conventional automatic fashion to allow the system to dehumidify air passing thereover. The plant includes a compressor which is coupled to the vehicle's engine by a control element such as an a/c clutch in a clutch cycling orifice tube (CCOT) system. Typically, the plant also includes a condenser, a refrigerant tank, pressure cycling switch, and an expansion orifice or capillary.

Figure 2:
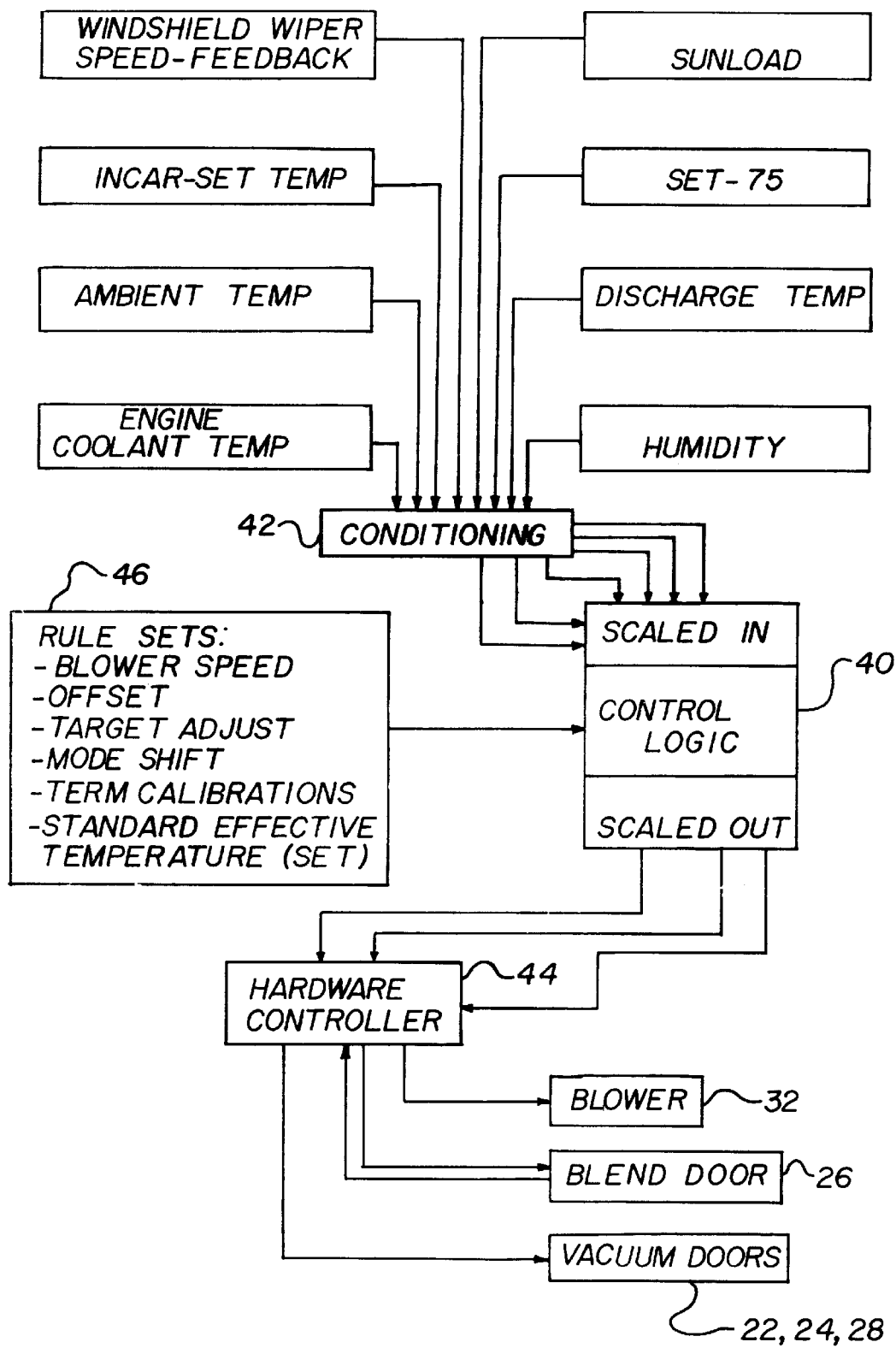
FIG. 2 is a schematic block diagram of the control system for operating the a/c system.

Referring to FIG. 2, for automatic control of the temperature and air flow in the cabin, conditions within and outside the cabin are monitored by sensors and a microprocessor based electronic controller generates signals to control the plant actuators according to the conditions as indicated by the sensors. A typical complement of sensors of the HVAC system provide signals which are representative of in-car temperature, ambient (outside) air temperature, engine coolant temperature (ECT), discharge air temperature, humidity and sunload. In addition, there is a set signal or set temperature value indicating the desired temperature that is set manually by the vehicle operator. In turn, an incar-set temperature (in-car minus set temperature) signal and a set-75 (set temperature minus 75° F.) signal are generated or calculated. In addition, blower speed, windshield wiper status, vehicle speed, a/c clutch duty cycle and time in air recirculation or partial recirculation mode are determined.

The signals are provided to the controller 40 as inputs after being conditioned by a conditioning circuit 42. The controller 40 scales the input signals and provides scaled output signals for use by a hardware controller 44 which, in turn, controls the doors 22, 24, 26 and 28, the blower 32 and clutch to regulate the temperature and flow of air. Rule sets 46 for the various control functions-blower speed, offset, target set point, mode shift, recirculation or partial recirculation/fresh ratio, term calibrations, clutch cycling rate or expansion valve position, etc.-provide controller with details of strategy to be performed.

Figure 3:
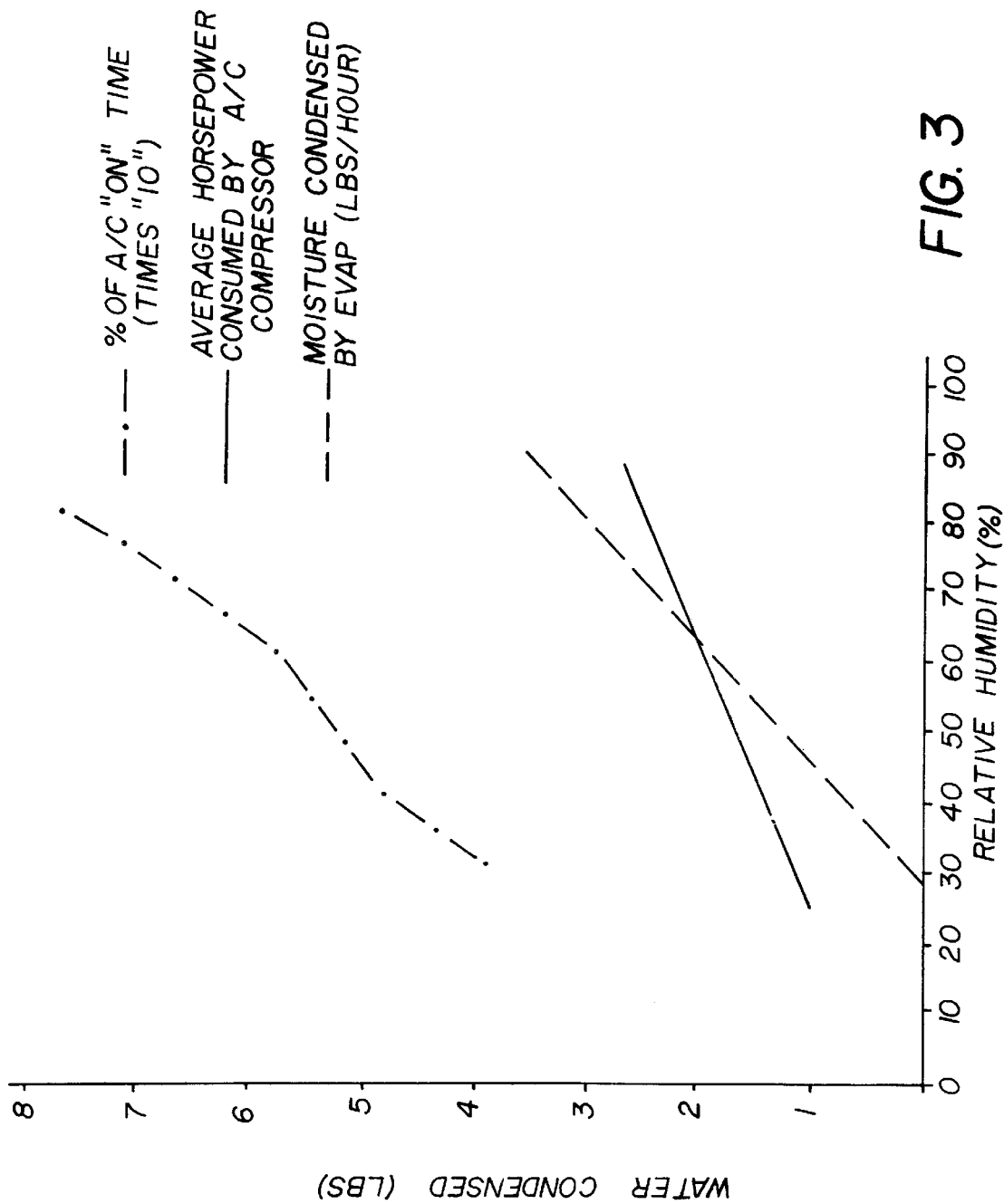
FIG. 3 graphically illustrates a/c on time, amount of moisture condensed and average horsepower consumed by the compressor as a function of relative humidity.
Figure 4:
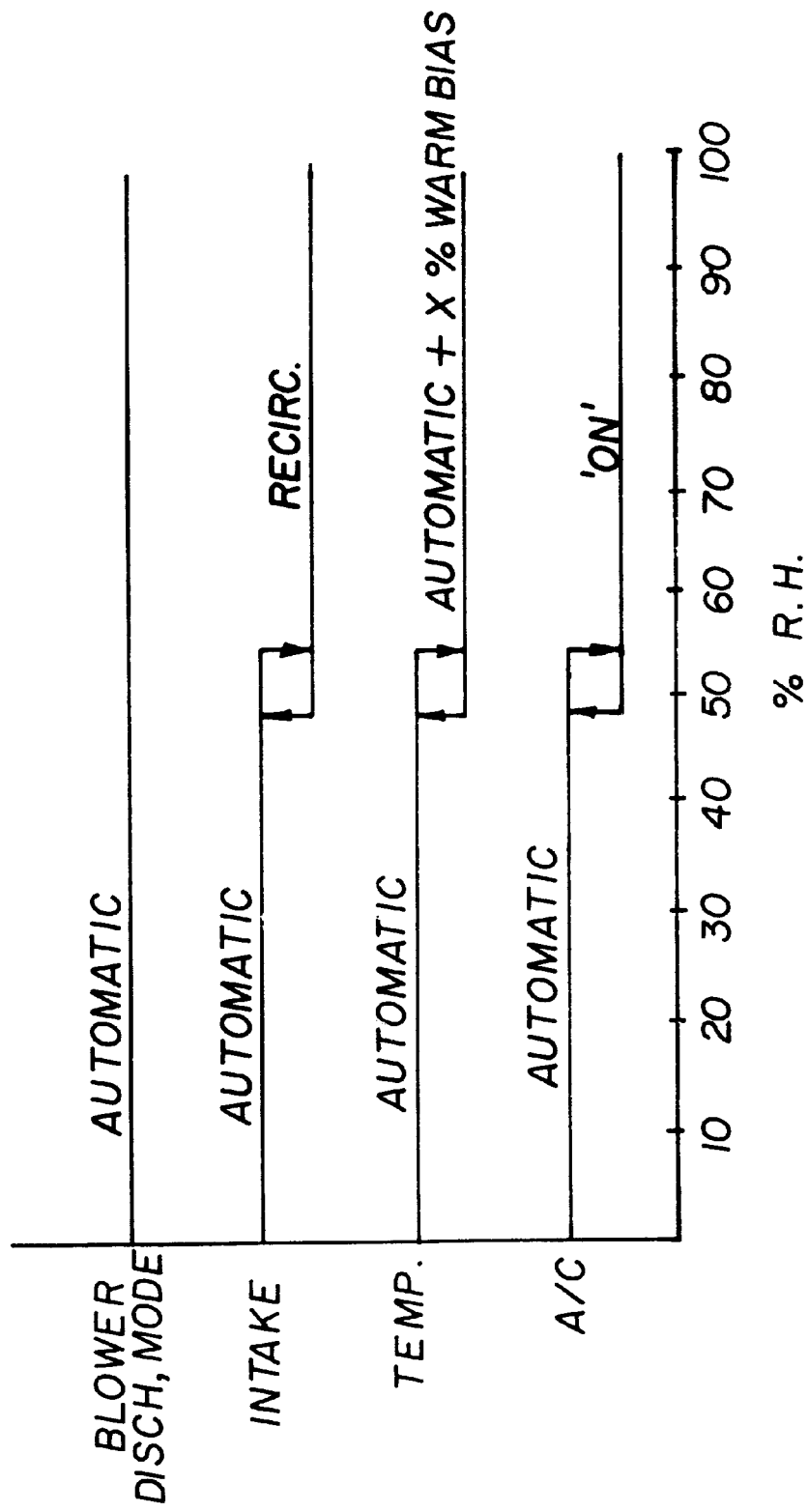
FIG. 4 graphically illustrates timing of different operating modes and parameters as functions of relative humidity.
Figure 5:
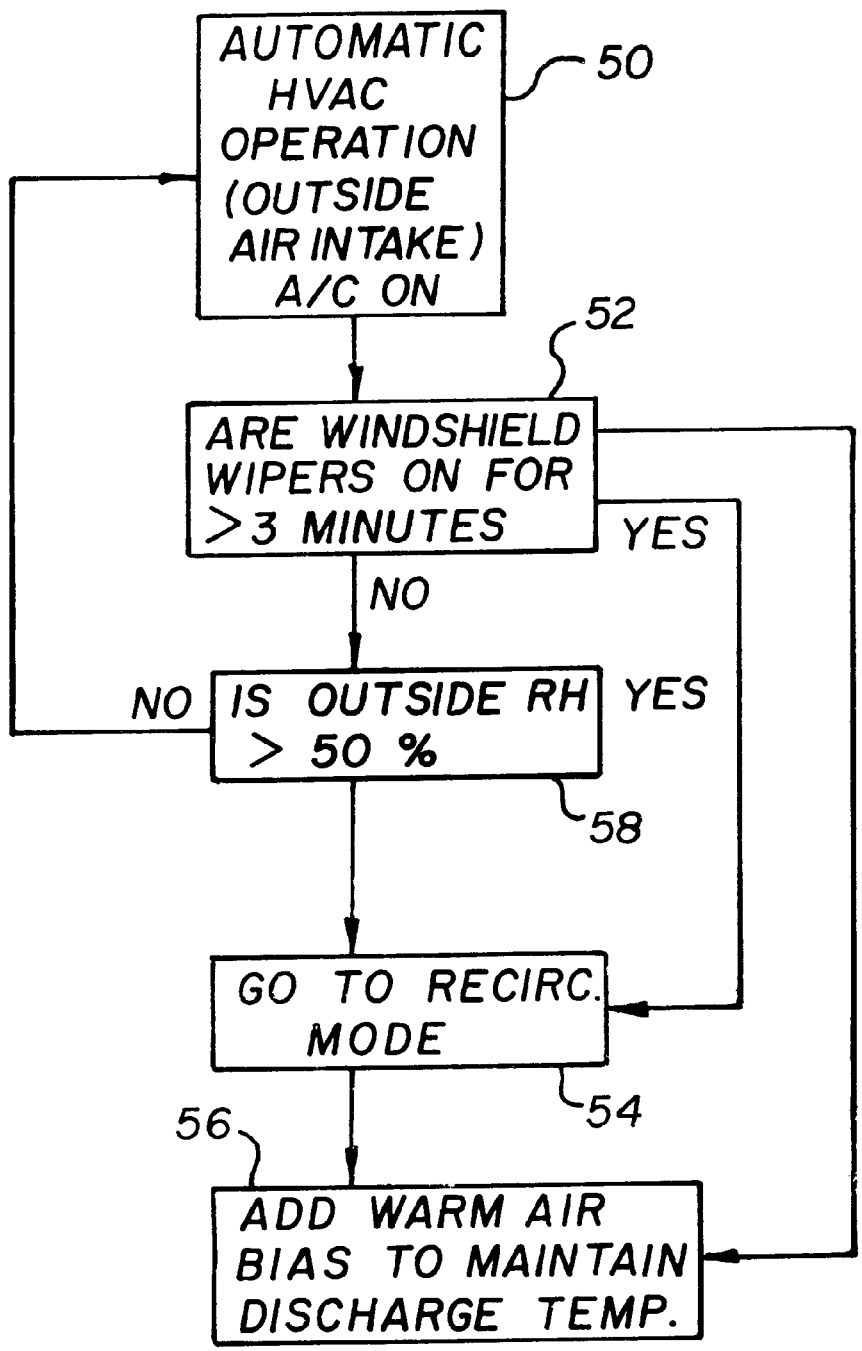
FIG. 5 is a flow chart depicting operation of the a/c system according to the present invention to reduce overall a/c workload and to remove moisture.

Referring to FIGS. 3–5, during air conditioner (a/c) operation, the HVAC system typically operates in recirculation or partial recirculation mode under extreme operating conditions until the cabin approaches a comfortable level, then operates in a fresh air mode unless manually overridden. FIG. 3 is a graph showing pounds of water condensed on the evaporator core as a function of relative humidity. At 30% relative humidity virtually no water is condensed, but at 80% relative humidity about three pounds of water is condensed per hour. FIG. 3 also shows average horsepower consumed by the a/c compressor as a function of relative humidity. At 30% relative humidity approximately 1.3 horsepower while at 80% relative humidity consumption is approximately 2.5 horsepower. Similarly a/c on time increases from about 40% at 30% humidity to about 75% at 80% humidity. FIG. 4 shows that at a threshold level, such as 50% for example, of relative humidity, the a/c remains on and the recirculation or partial recirculation mode is imposed with a warm air bias if the air intake temperature is sufficiently low. Intake temperature decreases with decreasing cabin temperature in the recirculation or partial recirculation mode but the warm air bias increase the discharge temperature to maintain the operator selected temperature.

Referring to FIG. 5, the present invention alters automatic operation to lower workload of the a/c system thereby boosting fuel economy. At block 50 the HVAC system operates in automatic mode and at block 52 queries whether the windshield wipers have been on for more than a predetermined minimum threshold period of time. A threshold period of three minutes is sufficient to conclude that it is raining or there is heavy fog which are high relative humidity conditions. When wiper on time exceeds the threshold, then at block 54, the HVAC system is put in recirculation or partial recirculation mode. In the recirculation or partial recirculation mode, cabin air is recirculated without introducing outside air. The outside air has very high humidity which could make the cabin uncomfortable and/or fog the windshield. Ensuring that the a/c system is on causes the evaporator core to condense moisture out of the recirculated air reducing humidity to an acceptable level. Warm air, from a heater of some type for example, can be added at block 56 to maintain HVAC discharge temperature and thereby regulate cabin temperature. Operation continues in recirculation or partial recirculation mode with a/c on until the wipers are turned off.

At block 52, if the wipers have not been on for a length of time greater than the threshold time, the outside relative humidity is considered at block 58. The invention will work with a wiper signal only, with a humidity signal only, or with both signals. When the humidity is greater than a predetermined minimum humidity value, 50% for example, the HVAC system goes into the recirculation or partial recirculation mode at block 54 as described above. The effect of this operation is to keep the cabin comfortable, avoid window fogging and conserve fuel. Comfort and absence of fogging are related to cabin humidity which is decreased when operating the recirculation or partial recirculation mode. Energy is conserved by selecting the threshold humidity which is related to moisture condensed by the evaporator core and horsepower used by the a/c system compressor. By switching to recirculation or partial recirculation mode during the extreme conditions of rain, heavy fog and very high humidity, comfort is maintained while minimizing fuel use. Less fuel is used because less moisture has to be removed from the recirculated cabin air than would have to be removed from fresh air or blended air and the a/c compressor operates less. Less moisture also translates to less opportunity for growth of microorganisms that promote unpleasant odors.

Operation of the present invention is believed to be apparent from the foregoing description and drawings, but a few words will be added for emphasis. The evaporator core operates at a temperature of about 38° F. to provide cool air to the cabin. Moisture in the air being cooled tends to condense on the evaporator core and hopefully exits through a drain hole in the evaporator housing. When operating in the outside air mode, the condensed moisture is directly related to the outside relative humidity. When the outside relative humidity is very high, on the order of 80% during rain or fog, there is more work required of the a/c system which lowers fuel economy, and there is more moisture induced in the evaporator housing which can lead to microbial growth and odor. Cabin comfort is maintained by automatically blending warmer air to maintain a constant discharge temperature.

It can now be appreciated that a method for reducing overall workload of a vehicle air conditioning (a/c) system has been presented. Normal operation for very humid days (80% or more relative humidity) in an average temperature range of 40° F. to 90° F. would ordinarily call for outside air intake. At this high level of humidity, the a/c compressor could consume about 2.5 hp. With a lower level of humidity, 30% for example, the energy consumption is greatly reduced down to about 1.3 hp. With the higher level of humidity, the present invention operates the system in the recirculation or partial recirculation mode which requires less work because the recirculated air has a much lower relative humidity value on the order of 30%.

While the threshold relative humidity as described herein was determined for a particular vehicle running at 1800 rpm at the compressor, a 70° F. cabin temperature and air flow of 100 cfm, exact parameters can be experimentally determined for other vehicles or systems. Experiments show that the relationships of FIG. 3 hold true that the average horsepower consumed by the a/c compressor varies linearly with humidity increasing with increasing humidity. Similarly, a/c on time and total moisture condensed by the evaporator increase with humidity. While the absolute numbers vary with air flow and cabin volume, the relationships hold.

As is evident from the foregoing description, certain aspects of the invention are not limited to the particular details of the examples illustrated, and it is therefore contemplated that other modifications and applications will occur to those skilled in the art. It is accordingly intended that the claims shall cover all such modifications and applications as do not depart from the true spirit and scope of the invention.

What is claimed is:

1. A method for reducing overall workload of a vehicle air conditioning (a/c) system, comprising the steps of:
   determining whether windshield wipers are on and have been on for longer than a preselected minimum threshold time;
   operating vehicle heating, ventilating and air conditioning (HVAC) system with the a/c on in a recirculation or partial recirculation mode when the wipers have been on for longer than said threshold time and removing moisture from cabin air thereby reducing amount of moisture condensed by evaporator core and decreasing overall workload of a/c system;
   determining whether outside relative humidity is above a preselected threshold humidity; and
   operating HVAC system with the a/c on in said recirculation or partial recirculation mode when the wipers have not been on for longer than said threshold time and relative humidity is greater than said threshold humidity to remove moisture from recirculated cabin air thereby reducing amount of moisture condensed by the evaporator core and decreasing overall workload of a/c system.

2. The method of claim 1 including the step of adding warm air bias to maintain HVAC discharge temperature thereby producing dehumidified cabin air at the desired temperature.

3. The method of claim 1 wherein the minimum threshold humidity is fifty percent.

4. The method of claim 1 wherein the minimum threshold time is three minutes.

5. The method of claim 1 wherein the HVAC system operates automatically to switch between the fresh air and recirculation or partial recirculation modes.

6. The method of claim 5 including the step of preventing the HVAC system from operating in the recirculation or partial recirculation mode when the a/c is not operating to thereby minimize noise and reduce interior window fogging.

7. A method for reducing overall workload of a vehicle air conditioning (a/c) system, comprising the steps of:
   determining whether outside relative humidity is above a preselected threshold humidity; and
   operating heating, ventilating and air conditioning (HVAC) system with the a/c on in a recirculation or partial recirculation mode when the relative humidity is greater than said threshold humidity to remove moisture from recirculated cabin air thereby reducing amount of moisture condensed by the evaporator core and decreasing overall workload of a/c system; and
   preventing the HVAC system from operating in the recirculation or partial recirculation mode when the a/c is not operating to thereby minimize noise and reduce interior window fogging.

8. The method of claim 7 wherein the minimum threshold humidity is fifty percent.

9. The method of claim 7 including the step of adding warm air bias to maintain HVAC discharge temperature thereby producing dehumidified cabin air at the desired temperature.

10. A method for reducing overall workload of a vehicle air conditioning (a/c) system, comprising the steps of:
    determining whether windshield wipers are on and have been on for longer than a preselected minimum threshold time; and
    operating vehicle heating, ventilating and air conditioning (HVAC) system with the a/c on in a recirculation or partial recirculation mode when the wipers have been on for longer than said threshold time and removing moisture from cabin air thereby reducing amount of moisture condensed by evaporator core and decreasing overall workload of a/c system.

11. The method of claim 10 including the step of adding warm air bias to maintain HVAC discharge temperature thereby producing dehumidified cabin air at the desired temperature.

12. The method of claim 10 wherein the minimum threshold time is three minutes.

13. The method of claim 10 including the step of preventing the HVAC system from operating in the recirculation or partial recirculation mode when the a/c is not operating to thereby minimize noise and reduce interior window fogging.

14. A method for minimizing amount of moisture condensing on a vehicle heating, ventilating and air conditioning (HVAC) system evaporator core, said HVAC system having a fresh air mode of operation wherein fresh outside air is mixed with vehicle cabin air and having a recirculation or partial recirculation mode of operation wherein cabin air is recirculated without mixing fresh outside air, said method comprising the steps of:
    determining whether windshield wipers are on and have been on for longer than a preselected minimum threshold time;
    operating the HVAC system with the a/c on in the recirculation or partial recirculation mode when the wipers have been on for longer than said threshold time to remove moisture from cabin air thereby minimizing moisture available to condense on the evaporator core;

determining whether outside relative humidity is above a preselected threshold humidity;

operating HVAC system in the recirculation or partial recirculation mode when the wipers have not been on for longer than said threshold time and relative humidity is greater than said threshold humidity, and turning a/c on to remove moisture from cabin air thereby minimizing moisture available to condense on the evaporator core; and adding warm air bias to maintain HVAC discharge temperature thereby producing dehumidified cabin air at the desired temperature.

15. The method of claim 14 wherein the minimum threshold time is three minutes.

16. The method of claim 14 wherein the minimum threshold humidity is fifty percent.

17. The method of claim 14 wherein the HVAC system operates automatically to switch between the fresh air and recirculation or partial recirculation modes.

18. The method of claim 14 including the step of preventing the HVAC system from operating in the recirculation or partial recirculation mode when the a/c is not operating to thereby minimize noise and interior window fogging.

* * * * *